US008234385B2

(12) United States Patent
Stoyanov et al.

(10) Patent No.: US 8,234,385 B2
(45) Date of Patent: Jul. 31, 2012

(54) FORMAT NEGOTIATION FOR MEDIA REMOTING SCENARIOS

(75) Inventors: Vladimir Stoyanov, Redmond, WA (US); Rajneesh Mahajan, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 552 days.

(21) Appl. No.: 11/749,637

(22) Filed: May 16, 2007

(65) Prior Publication Data

US 2008/0288519 A1    Nov. 20, 2008

(51) Int. Cl.
*G06F 15/16*    (2006.01)
*H04J 3/16*    (2006.01)

(52) U.S. Cl. .................. 709/227; 709/217; 370/465

(58) Field of Classification Search .......... 709/225–228, 709/207–208

See application file for complete search history.

(56) References Cited

U.S. PATENT DOCUMENTS

| | | | |
|---|---|---|---|
| 6,230,172 | B1 | 5/2001 | Purnaveja et al. |
| 6,449,653 | B2 | 9/2002 | Klemets et al. |
| 2003/0002854 | A1 | 1/2003 | Belknap et al. |
| 2003/0146977 | A1* | 8/2003 | Vale et al. .............. 348/207.1 |
| 2003/0177255 | A1 | 9/2003 | Yun |
| 2004/0128697 | A1* | 7/2004 | Wood et al. .............. 725/115 |
| 2004/0264383 | A1* | 12/2004 | Rudolph et al. .............. 370/252 |
| 2005/0175030 | A1* | 8/2005 | Moon et al. .............. 370/465 |
| 2005/0198189 | A1* | 9/2005 | Robinson et al. .............. 709/217 |
| 2006/0069797 | A1* | 3/2006 | Abdo et al. .............. 709/231 |
| 2006/0168219 | A1* | 7/2006 | Ahluwalia et al. .............. 709/225 |
| 2006/0184614 | A1 | 8/2006 | Baratto et al. |

FOREIGN PATENT DOCUMENTS

WO    WO 2004104735 A2 *  12/2004

OTHER PUBLICATIONS

Harold Carr; Serverside Encoding, Protocol and Transport Extensibility for Remoting Systems;2004; ACM 1581138717/04/0011.;329-334.*
Baratto, et al., "THINC: A Remote Display Architecture for Thin-Client Computing". retrieved on available as early as Dec. 13, 2006, at <<http://www.cs.columbia.edu/techreports/cucs-027-04.pdf>>, Columbia University, Jul. 2006, pp. 1-15.
Lemlouma, et al., "The Negotiation of Multimedia Content Services in Heterogeneous Environments", retrieved on available as early as Dec. 13, 2006, at <<http://scholar.goolge.com/scholar?hl=en&lr=&q=cache:    UkXfBBlfipUJ:194.199.20.6/publi/MMM01-Paper.ps+>>, Opera Project, Inria Rhone-Alpes, pp. 17.

* cited by examiner

*Primary Examiner* — Ashok Patel
*Assistant Examiner* — Evans Desrosiers
(74) *Attorney, Agent, or Firm* — Merchant & Gould PC

(57) ABSTRACT

Format negotiation for media remoting involves at least one media data format. In an example embodiment, a media format negotiation for playing media data is begun between a server and a client. The media data format is transferred from the server to the client. A notification that indicates if an attempt at the client to construct a media topology responsive to the media data format was a success or a failure is transferred from the client to the server. Whether and/or how the media data is to be transferred from the server to the client may be impacted by the notification.

17 Claims, 11 Drawing Sheets

Example of Local Media Playback Scenario

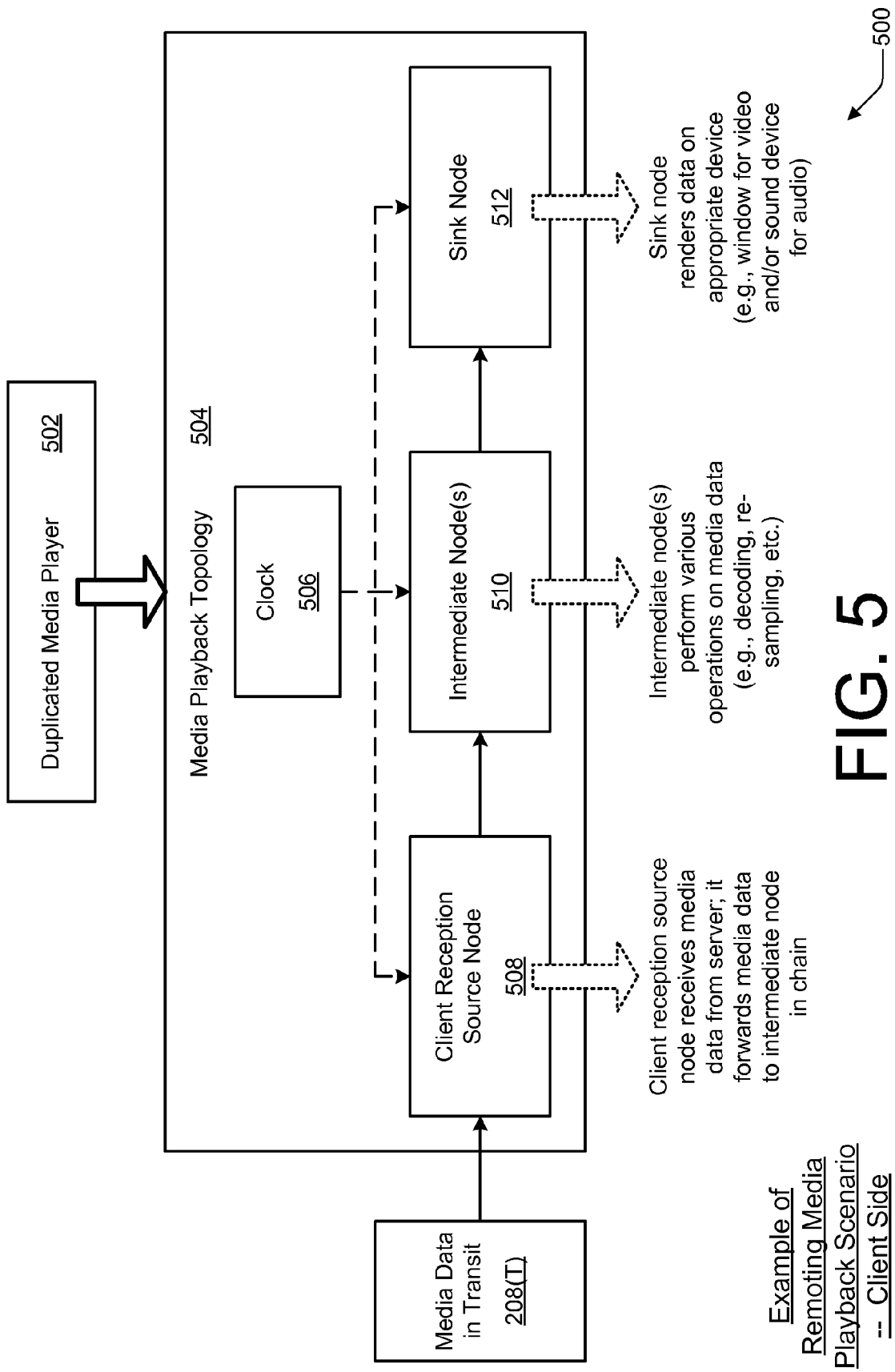

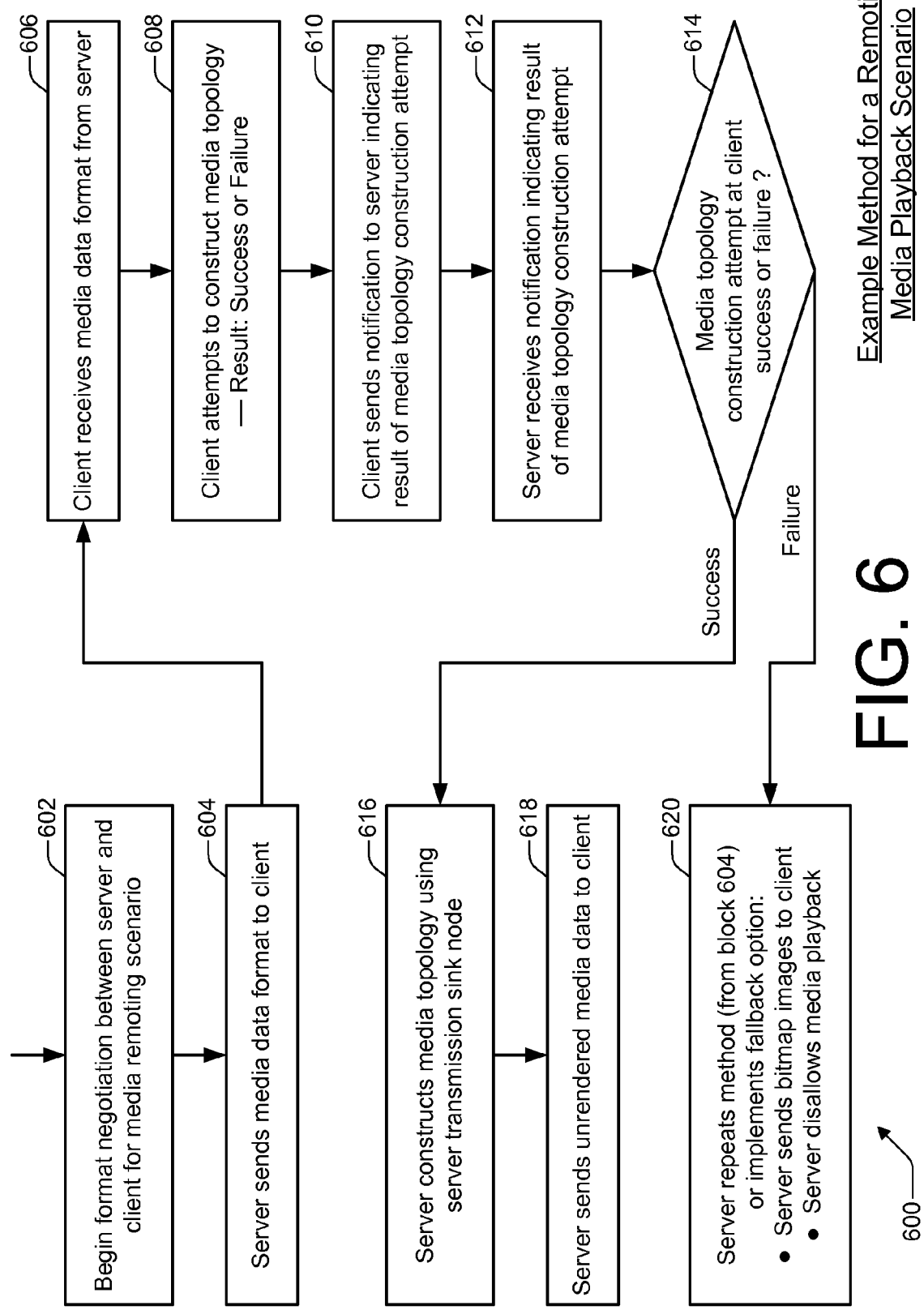

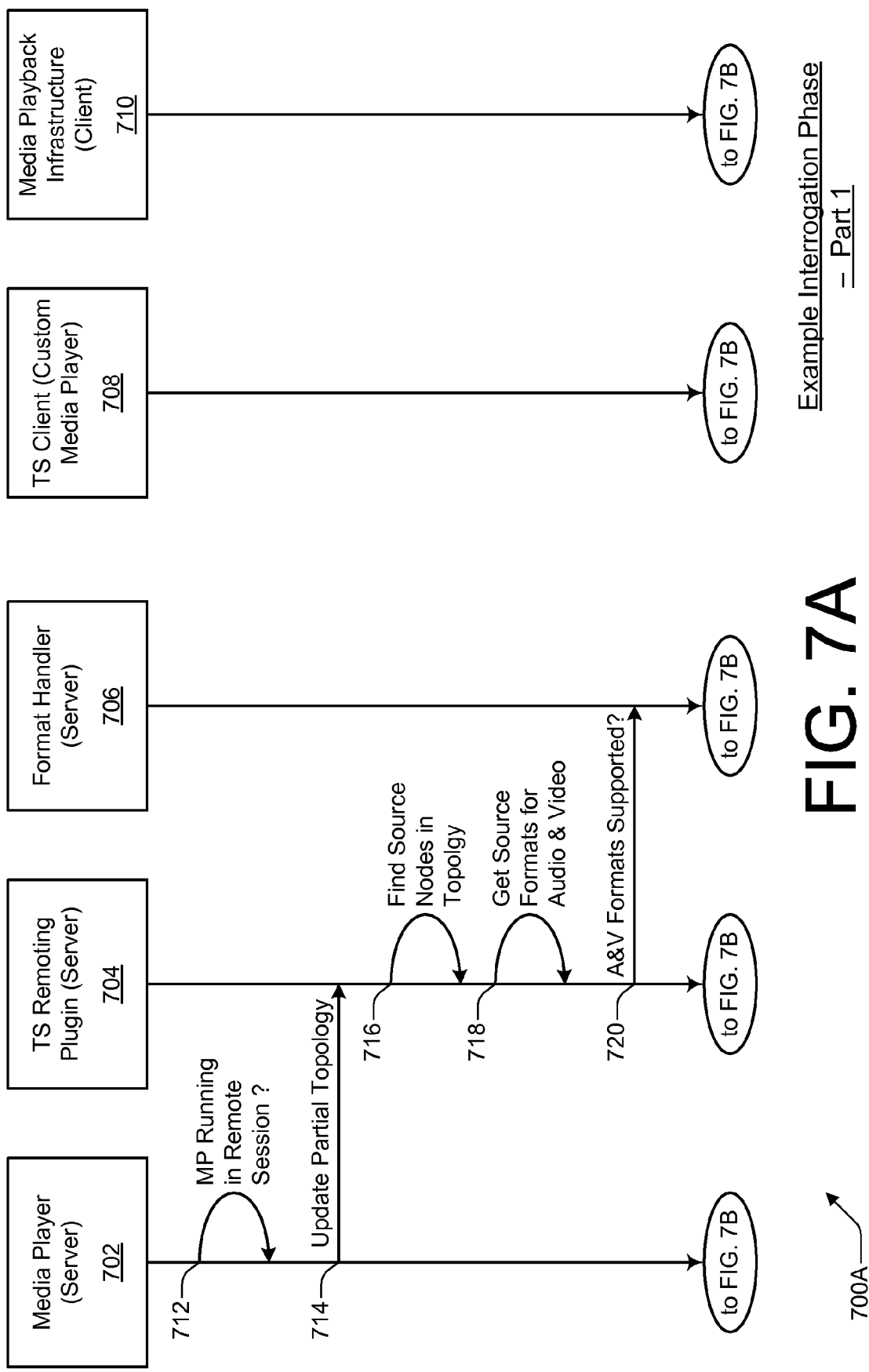

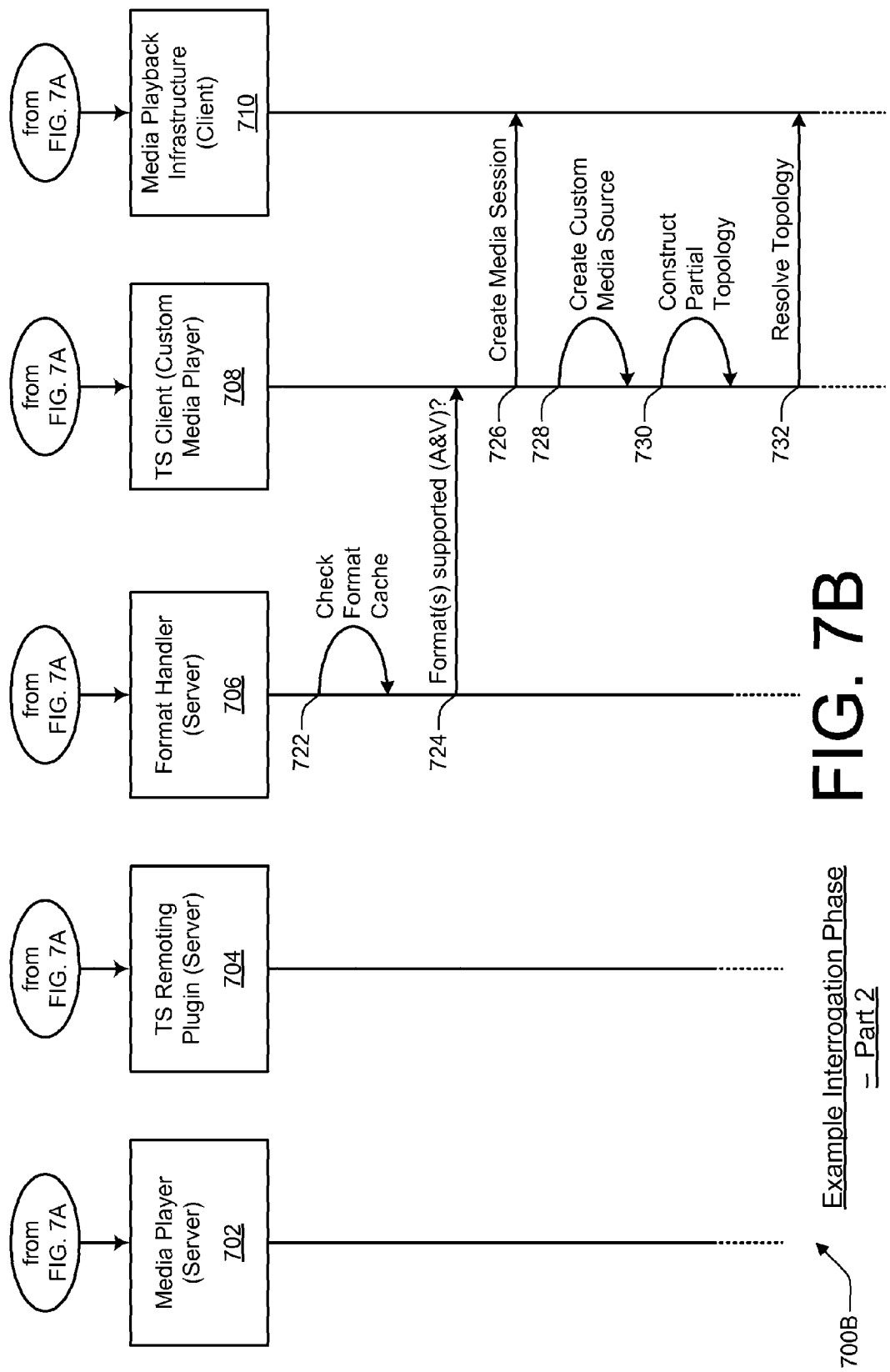

_US 8,234,385 B2_

FORMAT NEGOTIATION FOR MEDIA REMOTING SCENARIOS

BACKGROUND

Media data may be played locally on a processing device with a local media player. Typically, a processing device retrieves media data for a local media player. The local media player performs a series of operations on the media data to transform it. The transformed media data is then presented by the processing device via a display screen and/or speaker.

The transformed media data is usually much larger in size than the media data when it is initially retrieved. In other words, the transformed media data usually occupies relatively more memory for storage and consumes a relatively greater bandwidth during transmission. This larger size can therefore cause difficulties when media data is played in a remoting scenario in which less than all of the playing activities are conducted at a single location.

SUMMARY

Format negotiation for media remoting involves at least one media data format. In an example embodiment, a media format negotiation for playing media data is begun between a server and a client. The media data format is transferred from the server to the client. A notification that indicates if an attempt at the client to construct a media topology responsive to the media data format was a success or a failure is transferred from the client to the server. Whether and/or how the media data is to be transferred from the server to the client may be impacted by the notification.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Moreover, other method, system, scheme, apparatus, device, media, procedure, API, arrangement, etc. implementations are described herein.

BRIEF DESCRIPTION OF THE DRAWINGS

The same numbers are used throughout the drawings to reference like and/or corresponding aspects, features, and components.

FIG. 5 is a block diagram of an example client side of a remoting media playback scenario.

FIG. 6 is a flow diagram that illustrates an example of a method that involves a media format negotiation for media playback in a remoting scenario.

FIGS. 7A and 7B are parts 1 and 2, respectively, of an example sequence diagram between different server and client components for an interrogation phase of a media format negotiation.

DETAILED DESCRIPTION

Introduction

Media playback in a local scenario usually involves a media player creating a media topology. The topology includes source nodes that provide media data, intermediate nodes that transform the data and/or apply various effects, and sink nodes that render the data. These different nodes in a media topology are typically driven by a clock that controls the timing of data flow. A high level overview of an example approach to media playback in a local scenario is described below with particular reference to FIG. 1.

Figure 1:
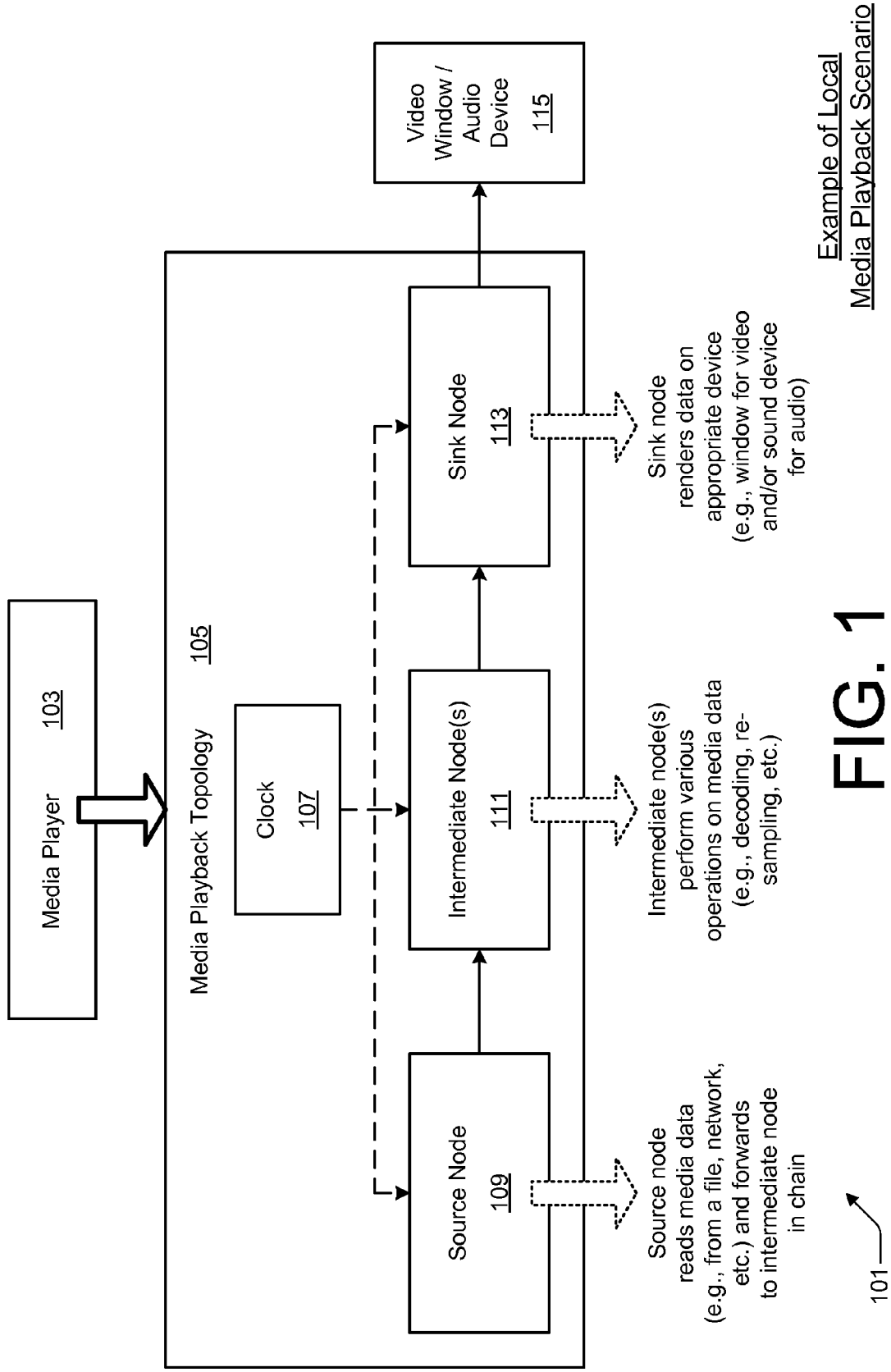
FIG. 1 is a block diagram illustrating an example of media playback in a local scenario.

FIG. 1 is a block diagram 101 illustrating an example of media playback in a local scenario. As illustrated, local media playback scenario 101 includes a media player 103 that creates a media playback topology 105. Media playback topology 105 includes a clock 107, a source node 109, one or more intermediate nodes 111, and a sink node 113. Clock 107 controls the timing of data flow through nodes 109, 111, and 113.

Source node 109 reads media data (e.g., from a file, a network, etc.) and forwards the media data to intermediate node(s) 111 of the media topology chain of media playback topology 105. Intermediate node(s) 111 perform various operations on the media data to transform it. These operations may include decoding, re-sampling, and so forth. A final intermediate node 111 forwards the transformed media data to sink node 113. Sink node 113 renders the media data on an appropriate device 115. An appropriate device 115 includes a window for video or a speaker for audio, or both for multimedia media data.

The media playback approach described above with reference to FIG. 1 is adequate for media playback in local scenarios. However, from time to time, media playback in a remoting scenario is requested. Terminal-server-based remoting scenarios, by way of example only, provide for a desktop remoting experience in which a thin-client can connect remotely over a network to another computer (e.g., the terminal server) to attain a remote desktop experience. In such a terminal server scenario, the applications run on the server, and they provide the desktop experience by remoting their "output" (e.g., graphics with respect to their visual output) to the client device over a network.

If media data is played on the server in a session with a terminal-server-based remoting scenario, various performance problems typically result. Such performance problems usually result from sending fast-changing bitmaps over network links (e.g., using a remote desktop protocol (RDP), etc.) and from the loss of synchronization between the video and the audio for multimedia media data. More specifically, the fast moving video frames result in an extraordinary amount of bitmap data that has to be transferred to the client. This results in a very high bandwidth and server CPU usage. Additionally, the audio and video tend to become unsynchronized because the timing information is often lost when sending video frames through rendered bitmaps (e.g., using a graphics device interface (GDI), etc.).

One approach to addressing these problems is to send encoded audio/video data directly to the client and to decode/render the data on the client. As a result, timing information, and thus audio and video synchronization, can be maintained. Such an audio/video remoting approach is affected, however, by the ability of the client to decode the provided audio/video data. Also, with certain server configurations, the server session operates more smoothly when the server learns beforehand if the client has available to it decoders that can support the requested audio/video data. For instance, some terminal server configurations involve separate topology creation phases and media playback phases that inhibit backtracking.

A procedure for determining if the client has available decoders that can support the requested audio/video data is often termed format negotiation. Learning if a client can handle the audio/video data beforehand can enable a server in certain configurations to fallback on bitmap-based remoting or to disable the playback at the client device in a remoting scenario by constructing an appropriate media playback topology at the server at an appropriate time.

Example embodiments address one or more issues of media format negotiation between a server and a client. In a described implementation, a server performs a media format negotiation with a client during (or at least prior to the completion of) the server media topology construction phase (e.g., before playback actually starts). The result of the media format negotiation is a relatively definitive response from the client that indicates if the client is able to decode media data received from the server in an identified media data format (e.g., a particular video and/or audio format). Also, the negotiation need not depend on any direct enumeration to the server of the formats supported by the client; hence, reliability may be increased. If the identified media data formats are not supported by the client, then the server may fallback on the bitmap-based remote playback or may disable remote playback for the client in a remoting scenario.

Example Implementations

Figure 2:
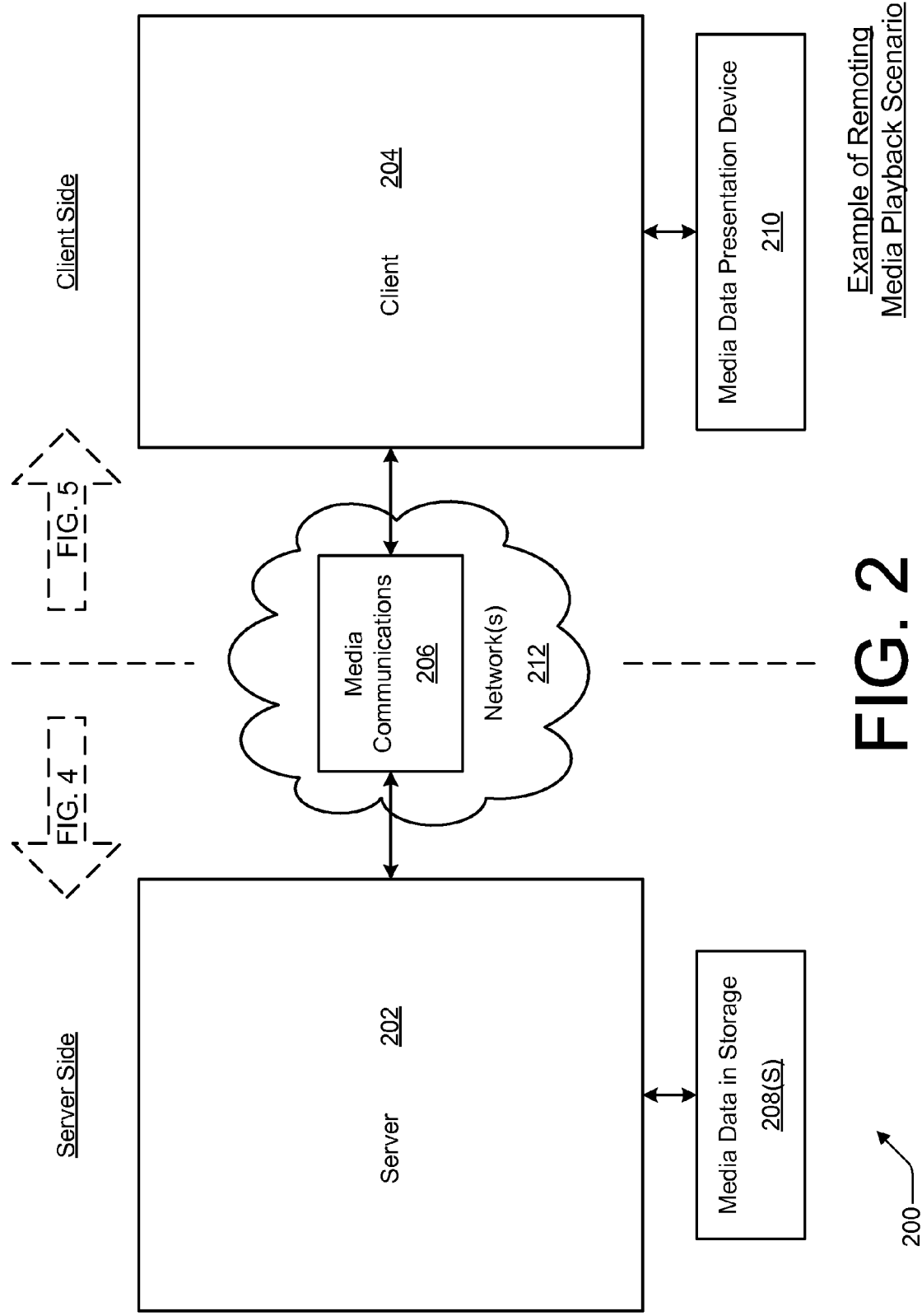
FIG. 2 is a block diagram illustrating an example environment for media playback in a remoting scenario that includes a server and a client and in which media communications may be exchanged.

FIG. 2 is a block diagram illustrating an example environment 200 for media playback in a remoting scenario that includes a server and a client and in which media communications may be exchanged. As illustrated, environment 200 includes a server 202, a client 204, and one or more networks 212. Media communications 206 may be exchanged by way of transfers between server 202 and client 204 over network 212. Environment 200 also includes media data in storage 208(S) and at least one media data presentation device 210.

In an example embodiment, server 202 includes or otherwise has access to media data 208, such as media data that is being stored 208(S). Media data 208 may be multimedia media data. In operation, server 202 engages in media-related communications 206 with client 204. Examples of media communications 206 include, but are not limited to, media data format negotiations, media data transfers, and so forth. Upon receiving media data, client 204 presents (e.g., plays, displays, etc.) the received media data on media data presentation device 210. Media data presentation device 210 may be coupled to or integrated with client 204. Media data presentation device 210 may be a display screen, a speaker, a window on a display screen, multiple such devices, some combination thereof, and so forth.

Server 202 may be any device that is capable of providing a media playing remoting scenario for a client 204. Server 202 may be a web server; a local area network (LAN), wide area network (WAN), etc. server; a cable network head-end; a home media server; a desktop computer; some combination thereof; and so forth. Client 204 may be any device that is capable of receptively participating in a media playing remoting scenario. Client 204 may be a notebook or desktop computer; a mobile telephone; a personal media player; a set-top box; a television or other entertainment device; a personal digital assistant (PDA) or highly-portable computer; a home media server; some combination thereof, and so forth.

Network(s) 212 may be comprised of one or more similar or different network types. By way of example only, network 212 may be a wired network or a wireless network; an internet; a LAN, WAN, etc.; a cellular network; a cable, telephone, or digital subscriber line (DSL) network; an Ethernet network; a mesh network; a Wi-Fi® network; a WiMAX® network; some combination thereof; and so forth. Although only one client 204 is explicitly shown, a single server 202 may be simultaneously providing a remoting media playback experience to multiple such clients 204 over network(s) 212.

Example environment 200 illustrates a server side on the left and a client side on the right. An example implementation of the server side with a constructed media topology is described herein below with particular reference to FIG. 4. An example implementation of the client side with a constructed media topology is described herein below with particular reference to FIG. 5.

Figure 3:
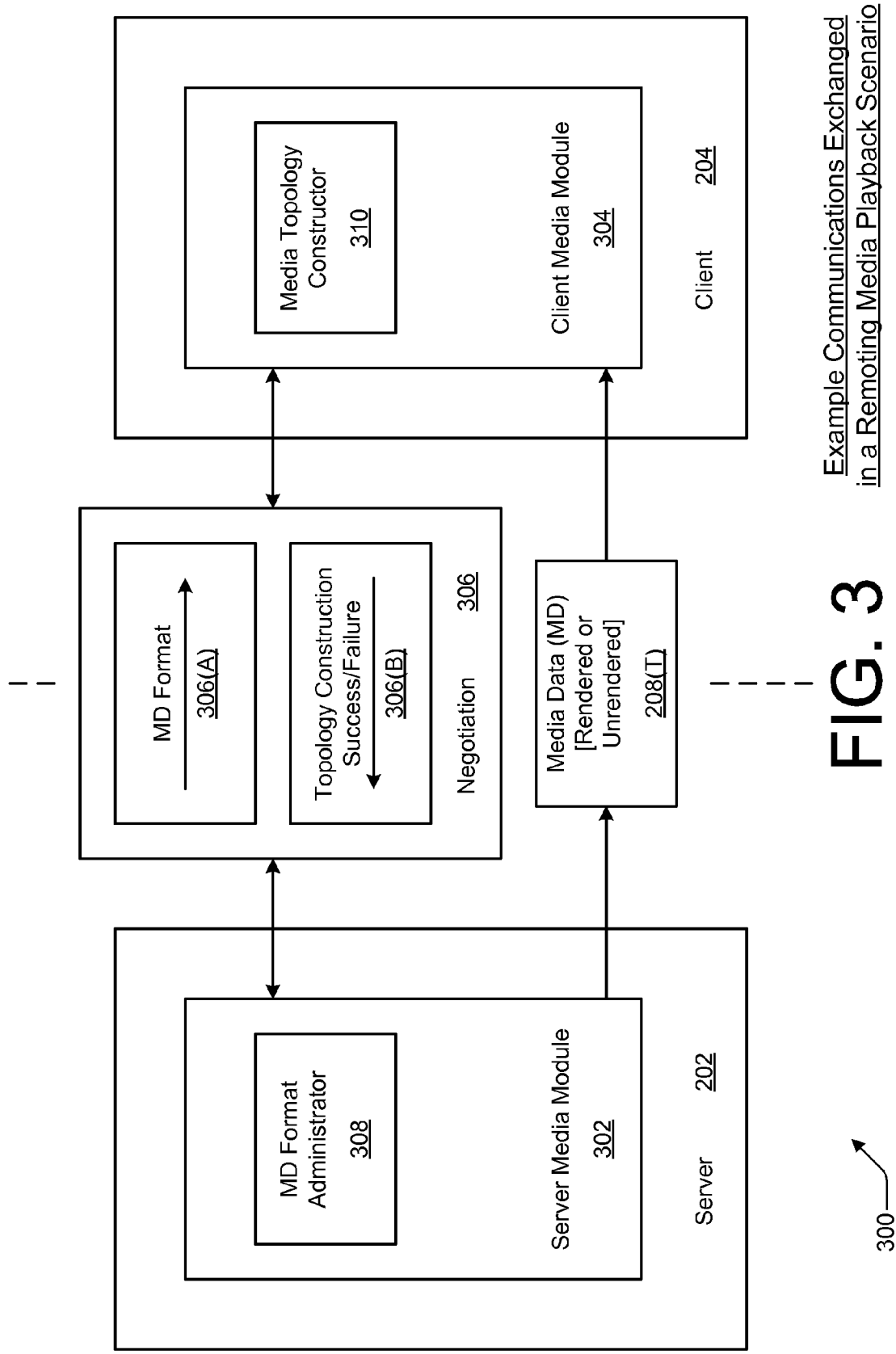
FIG. 3 is a block diagram illustrating a remoting media playback scenario that includes an example media format negotiation.

FIG. 3 is a block diagram illustrating a remoting media playback scenario 300 that includes an example media format negotiation 306. As illustrated, remoting media playback scenario 300 includes server 202 and client 204. Server 202 includes one or more server media modules 302. Client 204 includes one or more client media modules 304.

Server media module 302 includes a media data format administrator 308. Client media module 304 includes a media topology constructor 310. Server media module 302 and client media module 304 may be comprised of multiple other modules. Media data format negotiation 306 may include multiple negotiation-related communications, such as communications 306(A) and 306(B). Remoting media playback scenario 300 also includes media data that is in transit 208(T).

Server and client media modules 302 and 304 may be realized as processor-executable instructions in hardware, firmware, software, fixed logic circuitry, some combination thereof, and so forth. The module(s) may form part of another application, such as an operating system, a media player, and so forth. The module(s) may also form a separate application, may form one or more plugins for an application, and so forth. Server 202 and client 204 may be realized as devices. Example devices are described further herein below with particular reference to FIG. 10.

In an example embodiment, media data format negotiation 306 includes at least two media-related communications 306 (A) and 306(B). Media data format administrator 308 ascertains at least one media data format of identified and/or requested media data. The identified media data is usually requested by client 204. Media data format administrator 308 sends at least one media data format 306(A) to media topology constructor 310. It should be understood that other media modules at the server and/or the client may facilitate the transfer of communications between media data format administrator 308 and media topology constructor 310.

Media topology constructor 310 attempts to construct at client 204 a media topology responsive to media data format 306(A). If media topology constructor 310 is capable of constructing a media topology to play media data in the at least one media data format, then the attempt is successful. If media topology 310 is unable to construct the media topology, the attempt is failed. Media topology constructor 310 sends a topology construction notification 306(B) indicating the result of the topology construction attempt to media data format administrator 308. By way of example only, the indicated result of topology construction notification 306(B) may be success or failure.

If the indicated result is success, server media module 302 learns that a media topology has been successfully constructed by client media module 304. Consequently, server media module 302 may send media data in transit 208(T) in an unrendered form of media data format 306(A) toward client media module 304. If, on the other hand, the indicated result is failure, server media module 302 learns that a media topology was not successfully constructed by client media module 304. Consequently, server media module 302 may send media data in transit 208(T) in a rendered form (e.g., as bitmapped images) toward client media module 304. Alternatively, a failure result may prompt media data format administrator 308 to send another media data format 306(A) toward media topology constructor 310 when the requested media data is available in another format. Furthermore, a failure notification may alternatively precipitate a disallowance of remoting media playback with client 204 for the requested media data.

Figure 4:
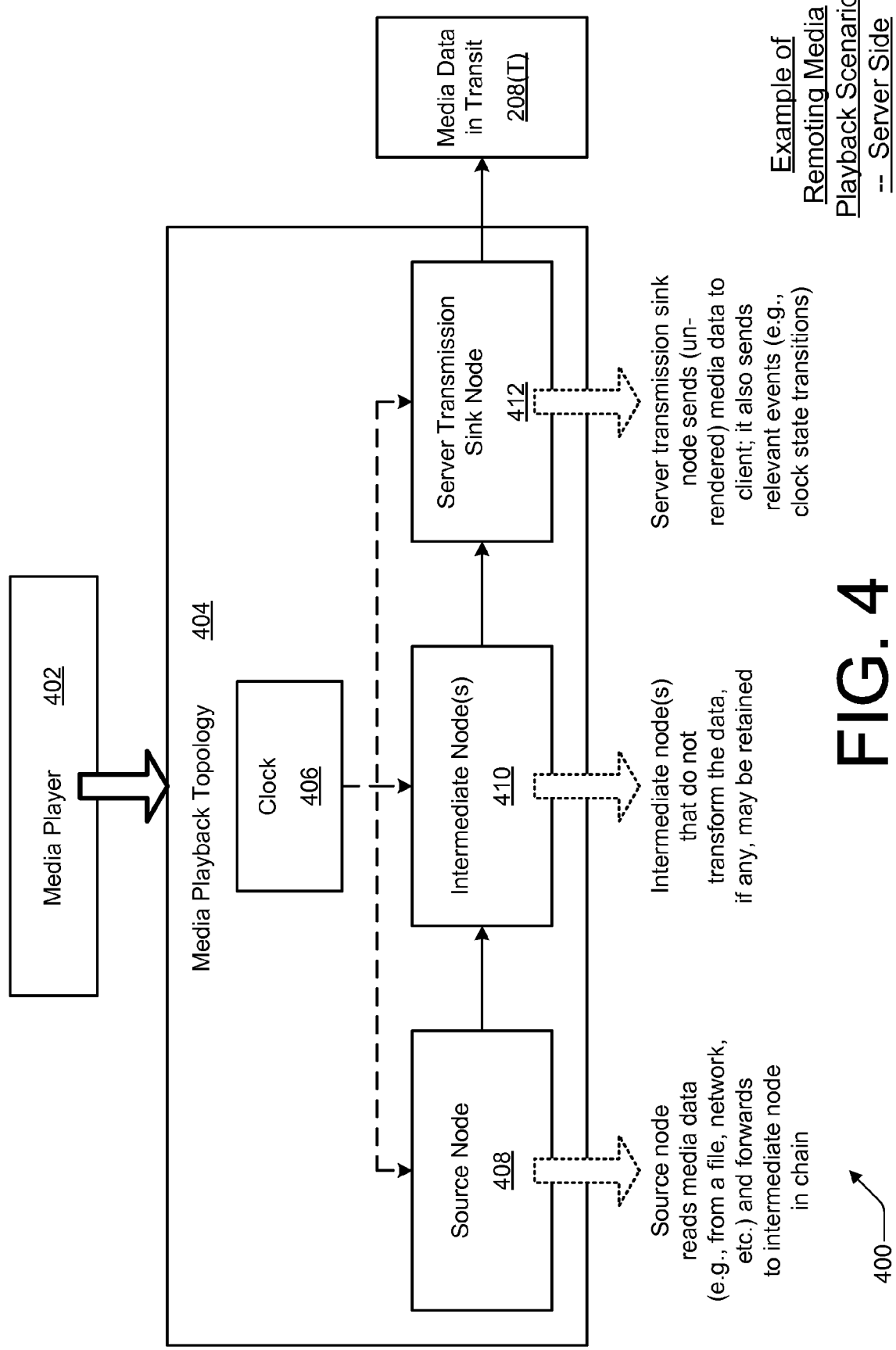
FIG. 4 is a block diagram of an example server side of a remoting media playback scenario.

FIG. 4 is a block diagram of an example server side 400 of a remoting media playback scenario. As illustrated, server side 400 of a remoting media playback scenario includes a media player 402 that constructs a media playback topology 404 on server 202 (of FIGS. 2 and 3). Media playback topology 404 includes a clock 406, at least one source node 408, one or more intermediate nodes 410, and at least one server transmission sink node 412. Clock 406 controls the timing of data flow through nodes 408, 410, and 412.

In an example embodiment, server media module 302 (of FIG. 3) of server 202 constructs media playback topology 404, which may then function as a module thereof. In operation, source node 408 retrieves the identified media data (e.g., from media data in storage 208(S)). The media data may be retrieved from, for example, a file, a network, and so forth. Source node 408 forwards the retrieved media data to intermediate node(s) 410 of a media topology nodal chain of media playback topology 404. Intermediate node(s) 410 may perform various operations on the media data. Because the rendering is being performed at the client, these operations may include any of those that do not transform the data. Intermediate node(s) 410 (e.g., a final intermediate node 410 if multiple ones are present) forwards the media data to server transmission sink node 412.

Server transmission sink node 412 sends unrendered media data towards the client. It also sends events that are relevant to playing the media data, such as clock state transitions, towards the client. Thus, server transmission sink node 412 sends media data in transit 208(T) toward the client. Media playback topology on the client side is described below with particular reference to FIG. 5.

FIG. 5 is a block diagram of an example client side 500 of a remoting media playback scenario. As illustrated, client side 500 of a remoting media playback scenario includes a duplicated media player 502 that constructs a media playback topology 504 on client 204 (of FIGS. 2 and 3). Media playback topology 504 includes a clock 506, at least one client reception source node 508, one or more intermediate nodes 510, and at least one sink node 512. Clock 506 controls the timing of data flow through nodes 508, 510, and 512.

In an example embodiment, client media module 304 (of FIG. 3) of client 204 constructs media playback topology 504, which may then function as a module thereof. In operation, client reception source node 508 receives media data in transit 208(T) from the server (e.g., directly or indirectly from server transmission sink node 412). Client reception source node 508 forwards media data 208 to intermediate nodes 510 of a media topology nodal chain of media playback topology 504.

Intermediate node(s) 510 perform various operations on the media data to transform the media data into renderable media data. By way of example only, such operations may include decoding, re-sampling, and so forth. Intermediate node(s) 510 (e.g., a final intermediate node 510 if multiple ones are present) forwards the renderable media data to sink node 512. Sink node 512 renders the media data on an appropriate device (e.g., media data presentation device 210 (of FIG. 2)) at client 204. An appropriate device includes, by way of example but not limitation, a display screen or window thereof for video or a speaker for audio, or both for multimedia types of media data.

FIG. 6 is a flow diagram 600 that illustrates an example of a method that involves a media format negotiation for media playback in a remoting scenario. Flow diagram 600 includes ten (10) blocks 602-620. Although the actions of flow diagram 600 may be performed in other environments and with a variety of hardware, firmware, software, fixed logic circuitry, etc. combinations, the illustrated aspects of FIGS. 2-5 may be used, by way of example only, to implement the method of flow diagram 600.

In an example embodiment, starting at block 602, a format negotiation begins between a server and a client for a media remoting scenario. For example, a media data format negotiation 306 may be initiated between a server media module 302 of a server 202 and a client media module 304 of a client 204.

At block 604, the server sends at least one media data format to the client. For example, a media data format administrator 308 of server media module 302 may send at least one media data format 306(A) to client media module 304 over networks 212. For instance, one video format and one audio format may be sent. Alternatively, one video or one audio format (but not both) may be sent. Furthermore, multiple media data formats may be sent to client media module 304 so that a media topology for each of them may attempt to be constructed, either sequentially or in parallel.

At block 606, the client receives the at least one media data format from the server. For example, media topology constructor 310 of client media module 304 may receive media data format 306(A) from media data format administrator 308.

At block 608, the client attempts to construct a media topology at the client, with a success or failure resulting. For example, media topology constructor 310 may attempt to construct a media topology 504 at client 204. This attempt may be a success or a failure.

At block 610, the client sends a notification to the server indicating the result of the media topology construction attempt. For example, media topology constructor 310 may send a topology construction notification 306(B) indicating a success or a failure result to media data format administrator 308. If multiple media data formats are sent to media topology constructor 310, multiple media topology constructions may be attempted until a successful result is achieved or until all received media data formats are exhausted. In this embodiment, notification 306(B) may explicitly indicate the media data format for which a media topology was successfully constructed.

At block 612, the server receives from the client the notification indicating the result of the media topology construction attempt. For example, media data format administrator 308 may receive topology construction notification 306(B) from media topology constructor 310.

At block 614, the server determines if the media topology construction attempt at the client resulted in a success or a failure. For example, media data format administrator 308 may determine if topology construction notification 306(B) indicates a successful result or a failure result. If the indicated result was a success, flow diagram 600 continues at block diagram 616. If the indicated result was a failure, flow diagram 600 continues at block 620.

At block 616, the server constructs a media topology at the server using a server transmission sink node that does not render the media data. For example, server media module 302 may add a server transmission sink node 412 to a media topology 404 at server 202. In such an example embodiment, media topology 404 is not completely constructed until a successful result is indicated in a notification received from the client. One or more other nodes (e.g., source node 408, intermediate nodes 410, etc.) may be constructed prior to receiving the notification.

At block 618, the server sends unrendered media data to the client. For example, server media module 302 may send unrendered media data 208 from server transmission sink node 412 over network 212 to a client reception source node 508 of client media module 304. The unrendered media data 208 may then be transformed at intermediate nodes 510 and rendered at sink node 512 on client 204.

At block 620, the server repeats the method of flow diagram 600 (e.g., from block 604), or the server implements a fallback option. For example, if fewer than all available media data formats have been sent to client 204 for a media topology construction attempt, then at block 604 a different media data format may be sent to the client. Alternatively or after the available media data formats are exhausted, a fallback option may be implemented. Example fallback options include, but are not limited to, the server sending bitmap images to the client, the server disallowing remoting media playback on the client, and so forth.

Figure 8:
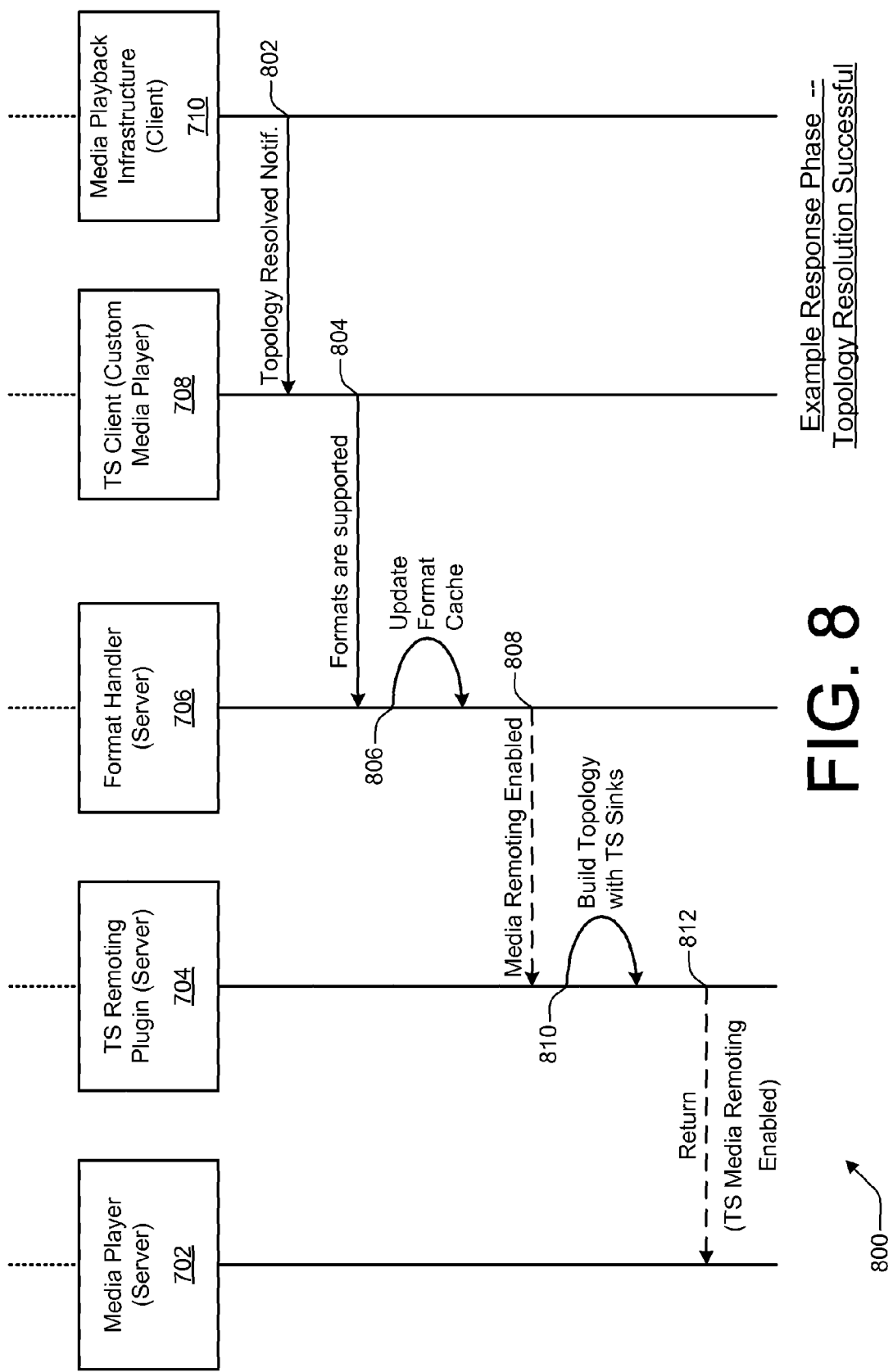
FIG. 8 is an example sequence diagram between different server and client components for a successful result for a response phase of a media format negotiation.
Figure 9:
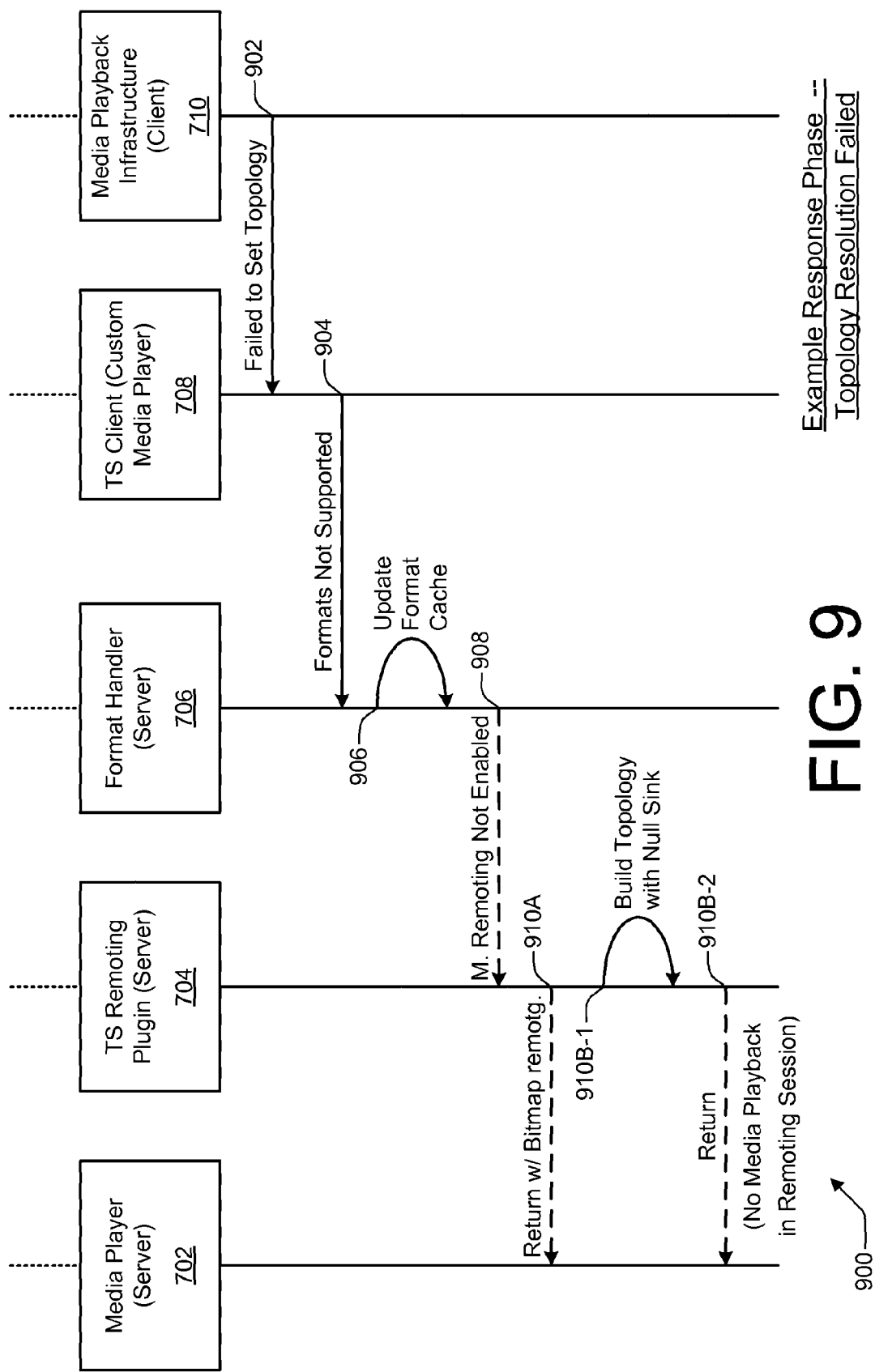
FIG. 9 is an example sequence diagram between different server and client components for a failure result for a response phase of a media format negotiation.

FIGS. 7A, 7B, 8, and 9 illustrate an example sequence diagram for different server and client components during a media communications exchange that includes a media format negotiation. FIGS. 7A and 7B are directed to parts 1 and 2 of an interrogation phase. FIGS. 8 and 9 are directed to a response phase—with FIG. 8 reflecting a successful topology resolution at the client and FIG. 9 reflecting a failed topology resolution at the client. The sequence diagram illustrates a relatively specific example implementation for format negotiation in a media remoting scenario. For example, the illustrated implementation involves a terminal server type of media remoting scenario.

As illustrated, there are three server components 702, 704, and 706, and two client components 708 and 710. These components include a server media player 702, a terminal server remoting plugin 704, a format handler 706, a terminal server client 708, and media playback infrastructure 710. Server media player 702 is a specific example of media player 402. Terminal server remoting plugin 704 is a plugin for server media player 702 to facilitate providing media playback in terminal server type remoting scenarios. Format handler 706 is a specific example of media data format administrator 308.

Terminal server client 708 is realized as a custom media player that is a specific example of duplicated media player 502 that is capable of interacting with format handler 706. Media playback infrastructure 710 is a specific example of media playback topology 504 at the client. Terminal server client 708 and media playback infrastructure 710 jointly perform at least some of the functionality of media topology constructor 310, as is described further herein below. By way of example only, one or more of these components may be implemented using Media Foundation™ technology.

FIGS. 7A and 7B are parts 1 and 2, respectively, of an example sequence diagram between different server and client components for an interrogation phase of a media format negotiation. Sequence diagram portion 700A is part 1 of the example interrogation phase, and sequence diagram portion 700B is part 2 of the example interrogation phase.

At action 712, it is checked if server media player 702 is running in a remote session. At action 714, server media player 702 instructs terminal server remoting plugin 704 to update the partial media topology. At action 716, terminal server remoting plugin 704 finds source node(s) for the media topology. At action 718, terminal server remoting plugin 704 ascertains the media format(s) of the source of the identified audio and video media data. At action 720, terminal server remoting plugin 704 asks format handler 706 to determine if the ascertained audio and video formats are supported by the requesting client.

At action 722 of sequence diagram portion 700B (of FIG. 7B), format handler 706 checks a format cache to determine if the requesting client has an entry therein. If so, then it may be determinable from the format cache that the requesting client does support the ascertained media formats. If not, then the sequence continues at action 724. At action 724, format handler 706 asks terminal server client 708 if the client supports the indicated audio and video formats.

At action 726, terminal server client 708 instructs media playback infrastructure 710 to create a media session. At action 728, terminal server client 708 creates a custom media source (e.g., client reception source node 508) for a media topology. At action 730, terminal server client 708 constructs additional nodes to form a partial media topology. At action 732, terminal server client 708 instructs media playback infrastructure 710 to resolve the media topology responsive to the indicated audio and video formats.

FIG. 8 is an example sequence diagram 800 between different server and client components for a successful result for a response phase of a media format negotiation. At action 802, media playback infrastructure 710 provides terminal server client 708 a topology resolved notification indicating that the attempt to resolve the topology at the client was successful. At action 804, terminal server client 708 informs format handler 706 that the formats are supported. At action 806, format handler 706 updates the format cache by including an entry positively associating the requesting client with the ascertained audio and video formats.

At action 808, format handler 706 informs terminal server remoting plugin 704 that media remoting is enabled. At action 810, terminal server remoting plugin 704 constructs the server media topology with terminal server sink(s) (e.g., with a server transmission sink node 412). At action 812, terminal server remoting plugin 704 returns control to server media player 702 with terminal server media remoting enabled.

FIG. 9 is an example sequence diagram 900 between different server and client components for a failure result for a response phase of a media format negotiation. At action 902, media playback infrastructure 710 provides terminal server client 708 a failed to resolve topology notification indicating that the attempt to resolve the topology at the client has failed. At action 904, terminal server client 708 informs format handler 706 that the formats are not supported. This informing may be explicit. Alternatively, the informing may be by indicating a failure to fully construct a media topology responsive to the formats. With some media technologies, a specific error code (e.g., indicating that topology construction failed because of incompatible formats) may be produced at the client and forwarded to the server. However, for certain implementations, failure to construct the topology for any reason may be sufficient motivation to avoid sending to the client unrendered media data. At action 906, format handler 706 updates the format cache by ensuring that no entry positively associates the requesting client with the ascertained audio and video formats. Any existing associations may be removed and/or a negative association indicating that formats are not supported may be included.

At action 908, format handler 706 informs terminal server remoting plugin 704 that media remoting is not enabled. Two example fallback options 910A and 910B are illustrated. As a first fallback option, at action 910A, terminal server remoting plugin 704 returns control to server media player 702 with bitmap-based media remoting enabled. As a second fallback option, at action 910B-1, terminal server remoting plugin 704 constructs the server media topology with a null sink. Then, at action 910B-2, terminal server remoting plugin 704 returns control to server media player 702 with no media playback remoting enabled for the requesting client for the requested media data in this session.

Example Device Implementations

Figure 10:
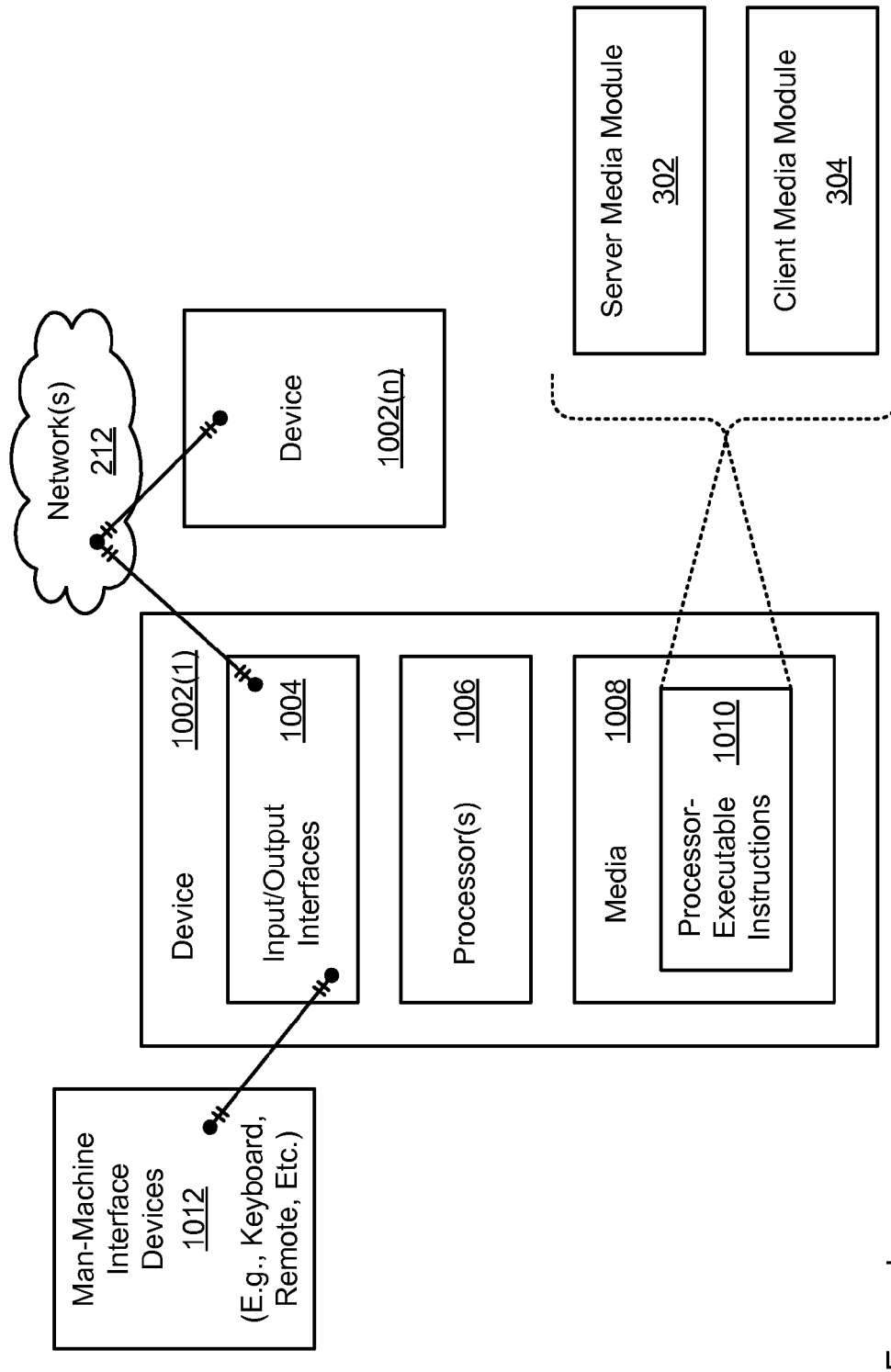
FIG. 10 is a block diagram of an example device that may be used to implement format negotiation for media remoting scenarios.

FIG. 10 is a block diagram of an example device 1002 that may be used to implement format negotiation for media remoting scenarios. Multiple devices 1002 are capable of communicating over one or more networks 212 (also of FIG. 2). Hence, servers 202 and/or clients 204 may be realized as devices 1002. Network(s) 212 may be, by way of example but not limitation, an internet, an intranet, an Ethernet, a public network, a private network, a cable network, a digital subscriber line (DSL) network, a telephone network, a Fibre network, a Grid computer network, an avenue to connect to such a network, a wireless network, a mesh network, some combination thereof, and so forth.

As illustrated, two devices 1002(1) and 1002(n) are capable of engaging in communications via network 212. Communications include, by way of example but not limitation, media-related communications 206. Although two devices 1002 are specifically shown, one or more than two devices 1002 may be employed, depending on implementation.

Generally, a device 1002 may represent any computer or processing-capable device, such as a server device; a workstation or other general computer device; a data storage repository apparatus; a personal digital assistant (PDA); a mobile phone; a gaming platform; an entertainment device; a router computing node; a mesh or other network node; a wireless access point; some combination thereof; and so forth. As illustrated, device 1002 includes one or more input/output (I/O) interfaces 1004, at least one processor 1006, and one or more media 1008. Media 1008 include processor-executable instructions 1010.

In a described implementation of device 1002, I/O interfaces 1004 may include (i) a network interface for communicating across network(s) 212, (ii) a display device interface for displaying information on a display screen, (iii) one or more man-machine interfaces, and so forth. Examples of (i) network interfaces include a network card, a modem, one or more ports, a network communications stack, a radio, and so forth. Examples of (ii) display device interfaces include a graphics driver, a graphics card, a hardware or software driver for a screen or monitor, and so forth. Examples of (iii) man-machine interfaces include those that communicate by wire or wirelessly to man-machine interface devices 1012 (e.g., a keyboard, a remote, a mouse or other graphical pointing device, etc.).

Generally, processor 1006 is capable of effectuating, performing, and/or otherwise executing processor-executable instructions, such as processor-executable instructions 1010. Media 1008 is comprised of one or more processor-accessible media. In other words, media 1008 may include processor-executable instructions 1010 that are executable by processor 1006 to effectuate the performance of functions by device 1002. Processor-executable instructions may be embodied as software, firmware, hardware, fixed logic circuitry, some combination thereof, and so forth.

Thus, realizations for format negotiation for media remoting scenarios may be described in the general context of processor-executable instructions. Generally, processor-executable instructions include routines, programs, applications, coding, modules, protocols, objects, components, metadata and definitions thereof, data structures, application programming interfaces (APIs), etc. that perform and/or enable particular tasks and/or implement particular abstract data types. Processor-executable instructions may be located in separate storage media, executed by different processors, and/or propagated over or extant on various transmission media.

Processor(s) 1006 may be implemented using any applicable processing-capable technology. Media 1008 may be any available media that is included as part of and/or accessible by device 1002. It includes volatile and non-volatile media, removable and non-removable media, storage and transmission media (e.g., wireless or wired communication channels), hard-coded logic media, combinations thereof, and so forth. Media 1008 is tangible media when it is embodied as a manufacture and/or composition of matter. For example, media 1008 may include an array of disks or flash memory for longer-term mass storage of processor-executable instructions 1010, random access memory (RAM) for shorter-term storing of instructions that are currently being processed and/or otherwise executed, link(s) on network 212 for transmitting communications, and so forth.

As specifically illustrated, media 1008 comprises at least processor-executable instructions 1010. Generally, processor-executable instructions 1010, when executed by processor 1006, enable device 1002 to perform the various functions described herein. Such functions include, but are not limited to: (i) those functions of server media module 302 or client media module 304; (ii) those actions that are illustrated in flow diagram 600 (of FIG. 6) and/or the sequence diagrams of FIGS. 7A-9; (iii) the functions of components 702-710 (of FIG. 7A et seq.); (iv) the nodes of media playback topologies 404 and 504 (of FIGS. 4 and 5); and so forth.

The devices, actions, aspects, features, functions, procedures, modules, data structures, protocols, components, communications, etc. of FIGS. 1-10 are illustrated in diagrams that are divided into multiple blocks and other elements. However, the order, interconnections, interrelationships, layout, etc. in which FIGS. 1-10 are described and/or shown are not intended to be construed as a limitation, and any number of the blocks and/or other elements can be modified, combined, rearranged, augmented, omitted, etc. in any manner to implement one or more systems, methods, devices, procedures, media, apparatuses, arrangements, etc. for format negotiation for media remoting scenarios.

Although systems, media, devices, methods, procedures, apparatuses, mechanisms, schemes, approaches, processes, arrangements, and other implementations have been described in language specific to structural, logical, algorithmic, and functional features and/or diagrams, it is to be understood that the invention defined in the appended claims is not necessarily limited to the specific features or acts described above. Rather, the specific features and acts described above are disclosed as example forms of implementing the claims.

What is claimed is:

1. A method in a media remoting scenario, the method comprising:
   beginning a media format negotiation between a server and a client before playing of media data;
   identifying communications for the media format negotiation with a request by the client of at least one media data format and a notification of constructing a media topology responsive to the at least one media data format;
   sending to the client the at least one media data format being requested as part of the media format negotiation;
   receiving from the client the notification that indicates when an attempt to construct at the client the media topology responsive to the at least one media data format was a success or a failure;
   controlling timing of data flow in the media topology, wherein the data flow is controlled through a clock through a client reception source node, one or more of intermediate nodes, and a sink node;
   when the notification indicates that the attempt to construct at the client the media topology responsive to the at least one media data format was a success, constructing the media topology based at least in part on:
      the client reception source node receiving the media data that is unrendered in transit from the server, the client reception source node forwarding the media data to the one or more of the intermediate nodes of a media topology nodal chain of the media topology;
      the one or more of the intermediate nodes performing decoding on the media data to transform the media data, the one or more of the intermediate nodes forwarding the transformed media data to the sink node; and
      the sink node rendering the decoded media data on a device at the client; and
   when the notification indicates that the attempt to construct at the client the media topology responsive to the at least one media data format was a failure, sending to the client a different media data format as part of the media format negotiation.

2. The method as recited in claim 1, further comprising:
   when the notification indicates that the attempt to construct at the client a media topology responsive to the at least one media data format was a failure, implementing at least one fallback option.

3. The method as recited in claim 2, wherein the implementing comprises:
   sending to the client the media data rendered as multiple bitmapped images; or
   disallowing playback of the media data on the client in the media remoting scenario.

4. The method as recited in claim 1, further comprising:
   when the notification indicates that the attempt to construct at the client the media topology responsive to the at least one media data format was a success, adding a server transmission sink node to the media topology at the server, the server transmission sink node to send to the client the media data unrendered in the at least one media data format and to send to the client events that are relevant to playing the media data.

5. The method as recited in claim 4, wherein the adding comprises:
   using a terminal server remoting plugin for a media player at the server to add the server transmission sink node to the media topology at the server.

6. The method as recited in claim 1, further comprising:
   receiving from the server the at least one media data format;
   attempting to construct at the client a media topology responsive to the at least one media data format, the attempt resulting in a success or a failure; and
   sending to the server the notification that indicates if the attempt to construct at the client a media topology responsive to the at least one media data format was a success or a failure.

7. The method as recited in claim 1, further comprising:
   checking a format cache at the server to determine when an identified client is associated with a particular media data format; and
   when the identified client is determined to be associated with the particular media data format by checking the format cache, sending to the identified client media data unrendered in the particular media data format.

8. A server for a media remoting scenario, the server comprising:
   at least one processor; and
   one or more processor-accessible storage device comprising processor-executable instructions that is implemented by the server using the at least one processor, the processor-executable instructions comprising:
      one or more server media modules to begin a media format negotiation between the server and a client for playing media data, the one or more server media modules including a media data format administrator to identify communications for the media format negotiation by receiving a request from the client of at least one media data format and sending to the client the at least one media data format as part of the media format negotiation, and to receive from the client a topology construction notification that indicates when an attempt at the client to construct a media topology responsive to the at least one media data format was a success or a failure;
      wherein the media format negotiation includes determining whether the client has available decoders to support the media data, the decoders to support audio and video data;
      the one or more server media modules are to send to the client the media data in other available media formats, when the topology construction notification indicates that the attempt at the client to construct the media topology responsive to the at least one media data format was a failure, by sending to the client a different media data format as part of the media format negotiation; and
      the one or more server media modules are to send to the client the media data unrendered in the at least one media data format when the topology construction notification indicates that the attempt at the client to construct a media topology responsive to the at least one media data format was a success, by constructing the media topology based at least in part on:
         a source node retrieving the media data from a storage, the source node forwarding the media data to one or more of the intermediate nodes of a media topology nodal chain of the media topology;

the one or more of the intermediate nodes performing various operations on the media data, the one or more of the intermediate nodes forwarding the media data to a server transmission sink node; and the server transmission sink node sending unrendered media data and clock state transitions and events that are relevant to playing the media data towards the client.

9. The server as recited in claim 8, further comprising after the other available media data formats are exhausted, the one or more server media modules are to send to the client the media data rendered as multiple bitmapped images or to disallow playback of the media data on the client in the media remoting scenario when the notification indicates that the attempt at the client to construct a media topology responsive to the at least one media data format was a failure.

10. The server as recited in claim 8, wherein the one or more server media modules further include a format cache having multiple entries, each entry of the multiple entries associating an identified client with one or more particular media data formats; and wherein the one or more server media modules are to check the format cache prior to sending to the client that at least one media data format during the media format negotiation.

11. The server as recited in claim 8, wherein the one or more server media modules are to construct the media topology at the server with one or more intermediate nodes that do not transform the media data.

12. The server as recited in claim 8, wherein the one or more server media modules are to provide, at least in part, a terminal-server-based remoting experience for the client.

13. The server as recited in claim 8, wherein the one or more server media modules comprise:
 a media player that is capable of playing the media data;
 a terminal server plugin for the media player that is to construct a media topology at the server to implement the media remoting scenario in a terminal server environment; and
 a format handler to interact with the terminal server plugin and to send to the client the at least one media data format.

14. A method in a media remoting scenario, the method comprising:
 beginning a media format negotiation between a server and a client for playing of media data, wherein the media format negotiation includes determining whether the client has available decoders to support the media data, the decoders to support audio and video data;
 identifying communications for the media format negotiation by the client sending a request of at least one media data format;
 receiving from the server a notification to construct a media topology responsive to the at least one media data format;
 attempting at the client to construct the media topology responsive to the at least one media data format, the attempt resulting in a success or a failure;
 controlling timing of data flow in the media topology by a clock through at least a client reception source node, one or more of intermediate nodes, and at least a sink node;
 sending to the server a topology resolved notification that indicates when the attempt at the client to construct a media topology responsive to the at least one media data format was a success or a failure;
 when the topology resolved notification indicates that the attempt at the client to construct a media topology responsive to the at least one media data format was a success, constructing the media topology based at least on part on:
  the client reception source node receiving the media data that is unrendered in transit from the server, the client reception source node forwarding the media data to the one or more of the intermediate nodes of a media topology nodal chain of the media topology;
  the one or more of the intermediate nodes performing decoding the media data to transform the media data, the one or more of the intermediate nodes forwarding the decoded media data to the sink node; and
  the sink node rendering the decoded media data on a device at the client; and
 when the topology resolved notification indicates that the attempt at the client to construct the media topology responsive to the at least one media data format was a failure, receiving at the client, a different media data format as part of the media format negotiation.

15. The method as recited in claim 14, further comprising:
 when the notification indicates that the attempt at the client to construct a media topology responsive to the at least one media data format was a failure, receiving from server the media data rendered as multiple bitmapped images.

16. The method as recited in claim 14, further comprising:
 concluding the media format negotiation between the server and the client without the client enumerating to the server media data formats that the client is capable of supporting.

17. The method as recited in claim 14, wherein the media remoting scenario comprises a terminal-server-based media remoting scenario;
 and wherein both of the actions of receiving and the action of sending are performed by a terminal-server-related media module.

* * * * *